United States Patent
Ueda et al.

(10) Patent No.: US 8,226,245 B2
(45) Date of Patent: Jul. 24, 2012

(54) COMPOSITE OPTICAL ELEMENT AND PROJECTION OPTICAL DEVICE

(75) Inventors: Mitsunori Ueda, Tokyo (JP); Yoshihiro Oshima, Kanagawa (JP); Kazutoshi Yamamoto, Tokyo (JP); Kiyoshi Toyota, Tokyo (JP); Atsuhiko Wajiki, Chiba (JP); Yuji Kato, Chiba (JP); Olivier Ripoll, Esslingen (DE); Juan Manuel Teijiro, Karlsruhe (DE)

(73) Assignees: Sony Corporation, Tokyo (JP); Sony Deutschland GmbH, Cologne (DE)

( * ) Notice: Subject to any disclaimer, the term of this patent is extended or adjusted under 35 U.S.C. 154(b) by 1097 days.

(21) Appl. No.: 11/786,339

(22) Filed: Apr. 11, 2007

(65) Prior Publication Data

US 2010/0007860 A1 Jan. 14, 2010

(30) Foreign Application Priority Data

Apr. 18, 2006 (JP) .................. 2006-114855

(51) Int. Cl.
*G03B 21/28* (2006.01)
(52) U.S. Cl. ............... 353/99; 353/20; 353/31; 353/33; 353/34; 353/37; 353/98; 353/122
(58) Field of Classification Search .............. 353/20, 353/31, 33, 34, 37, 98, 99, 122; 385/48, 385/123, 146; 359/838, 853, 858; 362/328, 362/235, 339, 608.624; 349/5, 7, 8, 9, 39, 349/38, 179
See application file for complete search history.

(56) References Cited

U.S. PATENT DOCUMENTS

| | | | | |
|---|---|---|---|---|
| 4,943,154 A * | 7/1990 | Miyatake et al. | ............... | 353/31 |
| 5,625,738 A * | 4/1997 | Magarill | ............... | 385/146 |
| 5,754,260 A * | 5/1998 | Ooi et al. | ............... | 349/10 |
| 5,959,778 A * | 9/1999 | Shimonura et al. | ............... | 359/618 |
| 6,120,152 A * | 9/2000 | Nakayama et al. | ............... | 353/31 |
| 6,284,382 B1* | 9/2001 | Ishikawa et al. | ............... | 428/428 |
| 6,583,828 B1* | 6/2003 | Wada et al. | ............... | 349/39 |
| 6,739,723 B1* | 5/2004 | Haven et al. | ............... | 353/20 |
| 7,101,063 B2* | 9/2006 | Long et al. | ............... | 362/328 |
| 7,172,290 B2* | 2/2007 | Li | ............... | 353/37 |
| 7,306,344 B2* | 12/2007 | Abu-Ageel | ............... | 359/838 |
| 7,318,644 B2* | 1/2008 | Abu-Ageel | ............... | 353/20 |
| 2003/0231262 A1* | 12/2003 | Janssen | ............... | 349/5 |
| 2005/0063196 A1 | 3/2005 | Li | | |
| 2005/0174768 A1* | 8/2005 | Conner | ............... | 362/235 |
| 2005/0185132 A1* | 8/2005 | Toriyama et al. | ............... | 349/179 |
| 2006/0044531 A1* | 3/2006 | Potekev | ............... | 353/122 |
| 2007/0252954 A1* | 11/2007 | McGuire et al. | ............... | 353/20 |
| 2008/0013587 A1* | 1/2008 | Tempea et al. | ............... | 372/93 |
| 2008/0084545 A1* | 4/2008 | Chen et al. | ............... | 353/33 |
| 2010/0007860 A1* | 1/2010 | Ueda et al. | ............... | 353/81 |

FOREIGN PATENT DOCUMENTS

| | | |
|---|---|---|
| EP | 1 581 010 | 9/2005 |
| EP | 1581010 | 9/2005 |
| JP | 09-166719 | 10/1990 |
| JP | 02-262602 | 6/1997 |

* cited by examiner

*Primary Examiner* — Georgia Y Epps
*Assistant Examiner* — Sultan Chowdhury
(74) *Attorney, Agent, or Firm* — Robert J. Depke; Rockey, Depke & Lyons, LLC

(57) ABSTRACT

A composite optical element is provided. The composite optical element includes a plurality of optical elements, in which at least one of the optical elements is formed of an element modifying an optical path and the other optical elements are bonded to an incident surface and/or exit surface of the element modifying the optical path with a low refractive index material layer in between.

12 Claims, 13 Drawing Sheets

FIG. 15A
FIG. 15B
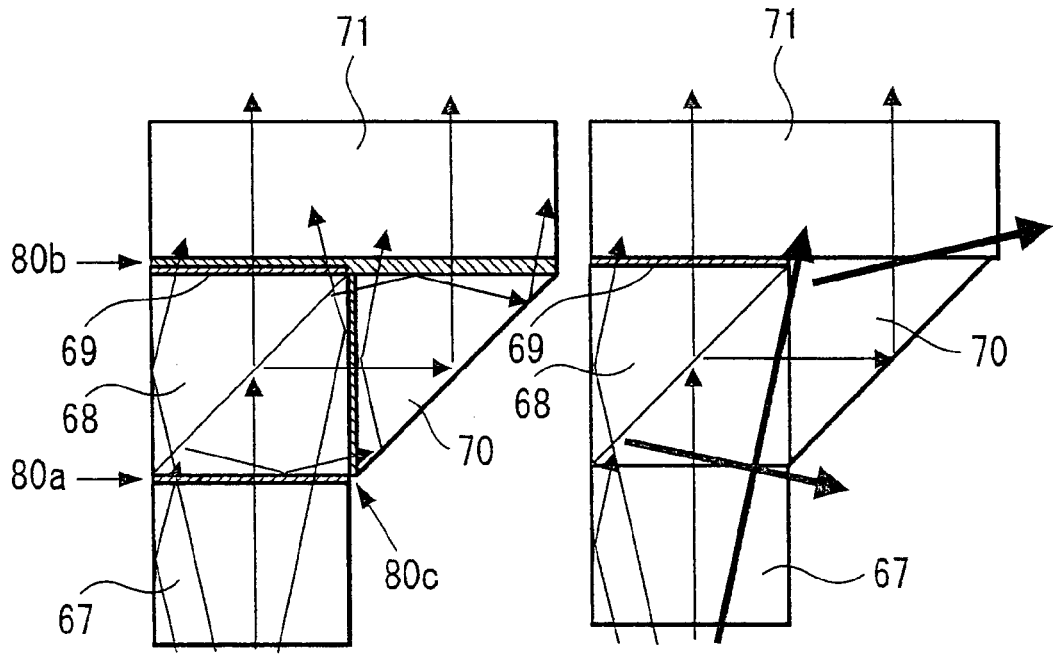
FIG. 16A
FIG. 16B
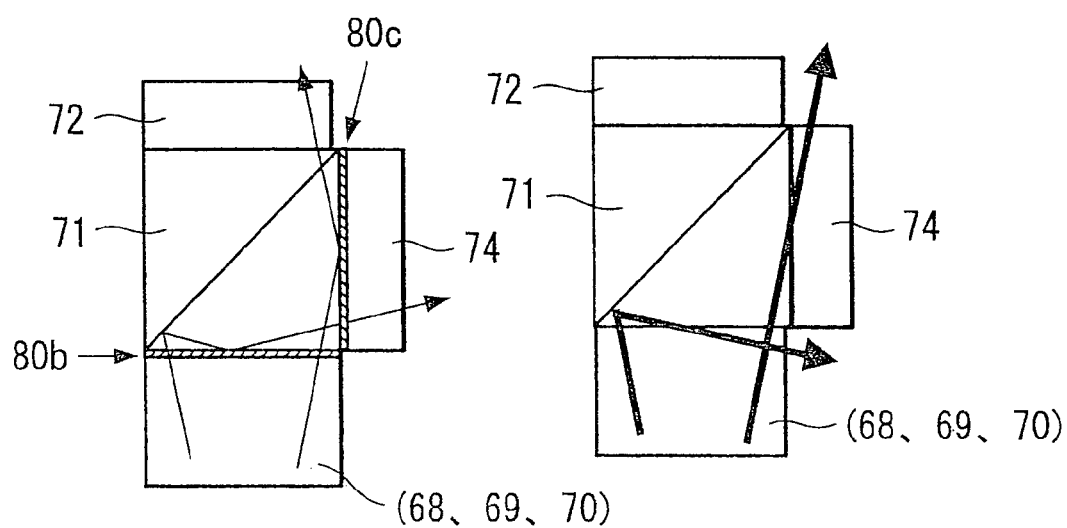

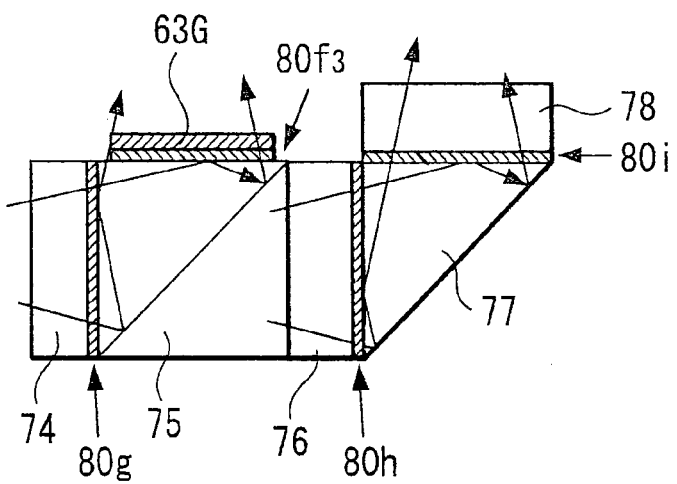
FIG. 17A
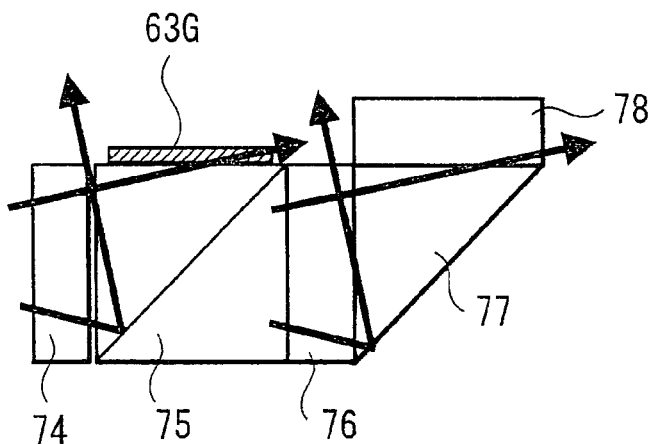
FIG. 17B
FIG. 18A    FIG. 18B
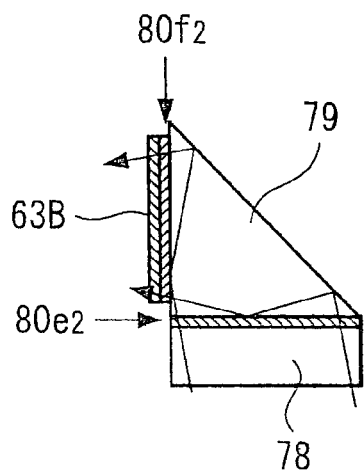
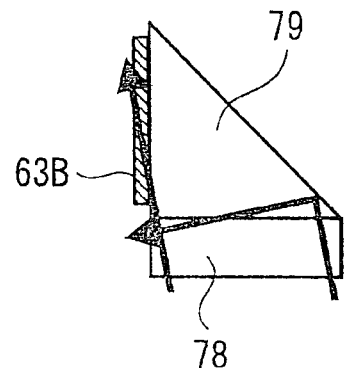

US 8,226,245 B2

COMPOSITE OPTICAL ELEMENT AND PROJECTION OPTICAL DEVICE

CROSS REFERENCES TO RELATED APPLICATIONS

The present invention contains subject matter related to Japanese Patent Application JP 2006-114855 filed in the Japanese Patent Office on Apr. 18, 2006, the entire contents of which being incorporated herein by reference.

BACKGROUND OF THE INVENTION

1. Field of the Invention

The present invention relates to a composite optical element including a plurality of optical elements in which at least one optical element is an element modifying an optical path.

Further, the present invention relates to a projection optical device that includes the above-described composite optical element, and projects an image on a screen.

2. Description of the Related Art

US Patent Application Publication No 20050063196 A1 discloses an optical system including a combination of a plurality of optical elements such as a light pipe constituting a light guiding path and a prism bending an optical path, for example. The light pipe represents the light guiding path that can propagate light while reducing optical loss and retaining uniformly brightness inside the pipe. In the case where the light guiding path is extended for a long distance, light is propagated using a medium of a coaxial structure such as an optical fiber having a core and clad, refractive indices of which are different. Further, it has been known that a minimum bending radius is determined by a difference between refractive indices of the core and clad, and a core diameter in such optical fiber. Accordingly, there is no need to combine a plurality of optical elements in an optical system such as a projector, if a light pipe having similar flexibility to the optical fiber is used. However, it is difficult at present to manufacture a small and reliable light guiding path using a mass-producible material having such flexibility and transparency, in other words, using a material suitable for the light pipe.

Light pipes typically use a prism to change a direction of propagating light. FIGS. 1 and 2 illustrate such optical systems respectively including a combination of a plurality of optical elements, for example. An optical system 1 shown in FIG. 1 is configured to have a combination of a rectangular prism 2 to orthogonally bend an optical path, and two light pipes 3 and 4 with the rectangular prism 2 provided in between. The rectangular prism 2 orthogonally bends incident light L entered from the light pipe 3 on one side, and guides the light L to the light pipe 4 on the other side. An optical system 6 shown in FIG. 2 is configured to have a combination of a non-rectangular prism 7 to bend the optical path in a required non-orthogonal direction, and two light pipes 8 and 9 with the non-rectangular prism 7 provided in between. The non-rectangular prism 7 bends incident light L entered from the light pipe 8 on one side at a required non-orthogonal angle, and guides the light L to the light pipe 9 on the other side.

The optical system 1 shown in FIG. 1 is configured such that air gaps (air layers) 11 are provided between the two light pipes 3, 4, and rectangular prism 2. The incident light L entered from the light pipe 3 on one side, more specifically, both of light beams La going straight and light beams Lb being guided obliquely, are totally reflected by the rectangular prism 2, and directed to the light pipe 4 on the other side (refer to FIG. 3). The optical system 6 shown in FIG. 2 is similarly configured such that air gaps 12 are provided between the two light pipes 8, 9, and non-rectangular prism 7. The incident light L entered from the light pipe 8 on one side is totally reflected by the non-rectangular prism 7, and directed to the light pipe 9 on the other side.

The reasons why those optical systems 1 and 6 are configured to have such air gaps 11 and 12 are described below. FIG. 4 shows, for example, an optical element 1' that represents an optical system in which the rectangular prism 2 and two light pipes 3 and 4 are simply stuck to be integrated, that is, to be one component. In such optical system 1', as shown in the figure, there is the case where the light beams Lb guided obliquely to the light pipe 3 pass through the light pipe 4 directly without being incident on a prism surface, and leaks to the outside, or the light beams Lb are reflected on the prism surface at 45°, and leaks to the outside. Therefore, the light beams Lb may not be appropriately guided to the light pipe 4 on the other side. This phenomenon is similar in the case where the optical system 6 shown in FIG. 2 is made into one integrated body by simply bonding the light pipes and prism together to be an optical element of one component.

There has been known a projection optical device (optical projector) in which an image-forming light valve such as a liquid crystal panel and a DMD (Digital Micromirror Device) is illuminated using an illumination optical system, and transmitted light or reflected light from the image-forming light valve is projected on a screen by a projection lens. In a projection optical device in general, light emitted from a light source is separated into red, green and blue each having a corresponding band of wavelength, modulated by the image-forming light valve in accordance with image information, and again combined to be projected on the screen, thereby displaying a color image.

US Patent Application Publication No. 20050063196 A1 and European Patent Application Publication No. 1581010 A1 disclose a projection optical device using a light pipe, thereby reducing the size of the device.

FIG. 5 shows an example of a projection optical device (optical projector) of the related art. A projection optical device 21 is configured to have a white light source 22, image-forming light valves 23R, 23G, and 23B corresponding to red, green and blue, illumination optical system 24 that separates light emitted from the white light source 22 into bands of wavelengths of red, green and blue so that light of respective bands of wavelengths enters the corresponding image-forming light valves 23R, 23G, 23B. Further, the projection optical device includes a cross prism 25 that is an optical element to combine color light respectively modulated in accordance with image information using the image-forming light valves 23R, 23G and 23B, and projection lens 26.

The illumination optical system 24 includes: a tapered light pipe 27 to guide the light emitted from the white light source 22, polarization beam splitter 28 to divide the light emitted from the white light source 22 into a P-wave and an S-wave, ½ wavelength plate 29 disposed at one exit surface of the polarization beam splitter 28, and first rectangular prism 30 being disposed at the other exit surface of the polarization beam splitter 28 and orthogonally bending an optical path. Further, the illumination optical system 24 includes a first dichroic prism 31 that is an optical element to divide light and is disposed at exit surfaces of the ½ wavelength plate 29 and first rectangular prism 30, second rectangular prism 33 disposed at one exit surface of the first dichroic prism 31 with a light pipe 32 in between, and second dichroic prism 35 disposed at the other exit surface of the first dichroic prism 31 with a light pipe 34 in between. Moreover, the illumination optical system 24 includes a third rectangular prism 37 disposed at one exit surface of the second dichroic prism 35 with a light pipe 36 in between, and fourth rectangular prism 39 disposed at an exit surface of the third rectangular prism 37 with a light pipe 38 in between.

The first dichroic prism 31 transmits the first color light of red, for example, and reflects the second color light and third color light of, for example, blue and green. The second dichroic prism 35 transmits the second color light of blue, for example, and reflects the third color light of green. An exit surface of the second rectangular prism 33 faces the red image-forming light valve 23R, for example. The other exit surface of the second dichroic prism 35 faces the green image-forming light valve 23G, for example. An exit surface of the fourth rectangular prism 39 faces the blue image-forming light valve 23B, for example.

The image-forming light valves 23R, 23G and 23B are formed of liquid crystal panels and polarization plates, for example. The beam splitter 28 transmits the P-wave and reflects the S-wave, for example.

Further, air gaps A, B, C, D, E1, E2, F1, F2, F3, G, H and I are formed respectively between elements modifying the optical path, and optical elements on the incident side and/or exit side of the elements modifying the optical path. The elements modifying the optical path include the polarization beam splitter 28, first and second dichroic prisms 31 and 35, first, second, third, fourth rectangular prisms 30, 33, 37, 39, and cross prism 25.

In the projection optical device 21, light emitted from the white light source 22 is directed to the tapered light pipe 27 and incident on the polarization beam splitter 28. The P-wave that is one divided component of the light incident on the polarization beam splitter 28 is transmitted through the polarization beam splitter 28, and converted into the S-wave by the ½ wavelength plate 29 to be incident on the first dichroic prism 31. On the other hand, the S-wave that is the other component of the light divided (reflected) by the polarization beam splitter 28 is orthogonally bent by the first rectangular prism 30, and incident on the first dichroic prism 31.

The light incident on the first dichroic prism 31 is divided. Red light divided is transmitted through the dichroic prism 31, and passes through the light pipe 32 and second rectangular prism 33 to be incident on the red image-forming light valve 23R. On the other hand, green light and blue light divided are reflected by the dichroic prism 31, are directed to the light pipe 34, and enter the second dichroic prism 35 to be divided. Specifically, the green light divided is reflected by the dichroic prism 35 to be incident on the green image-forming light valve 23G. The blue light divided is transmitted through the dichroic prism 35, passes through the light pipe 36, third rectangular prism 37, light pipe 38 and fourth rectangular prism 39 to be incident on the blue image-forming light valve 23B.

Color light components of red, green, and blue modulated in respective image-forming light valves 23R, 23G and 23B in accordance with image information enter the cross prism 25 and are combined. The combined image information light is magnified by the projection lens 26 and projected on the screen.

SUMMARY OF THE INVENTION

In the above-described optical system 1 shown in FIG. 1 and optical system 6 shown in FIG. 2, it is necessary to dispose the three optical elements (prisms 2 and 7, light pipes 3 and 8, light pipes 4 and 9, respectively) with the air gaps 11 and 12 provided in between, in order for the light obliquely incident on the prisms 2 and 7 to be totally reflected and guided to the light pipes 4 and 9 on the exit side. Therefore, it was difficult to integrate those three optical elements into one unit by bonding together, for example.

Further, mechanisms to maintain the air gaps 11 and 12 being a small space may be required in those optical systems 1 and 6, and therefore it has been difficult to mechanically dispose and maintain the light pipes 3, 4 and prism 2, or the light pipes 8, 9 and prism 7 with accuracy. As a result, precise alignment of such optical systems 1 and 6 may be critical due to environmental causes such as shock, temperature change and the like, which prevents the systems from being used as portable units.

In addition, the optical systems 1 and 6 include the air gaps 11 and 12, respectively, and therefore it has been difficult to reduce the size of the optical systems. Furthermore, it has been difficult to integrate a plurality of components into one unit, when considering the optical system formed of the plurality of optical elements including an element modifying the optical path to be a module. Thus, there has been such a problem that the optical system of the related art is mechanically less reliable and stable.

The projection optical device 21 shown in FIG. 5 also includes a plurality of optical elements including an element modifying the optical path, and therefore there are similar problems to those described above. In addition, it is desirable to improve efficiency in the use of light emitted from the light source, and to provide the whole device with a compact and robust structure.

There is a need for providing a composite optical element in which air gaps are not required, and the mechanical reliability and stability are improved.

In addition, it is desirable to provide a compact and robust projection optical device that includes the above-described composite optical element and has excellent efficiency in the use of light emitted from a light source.

A composite optical element according to an embodiment of the present invention includes a plurality of optical elements, at least one of which is formed of an element modifying an optical path, and the others of which are bonded to an incident surface and/or exit surface of the element modifying the optical path with a low refractive index material layer in between.

A projection optical device according to an embodiment of the present invention includes a composite optical element that has a plurality of optical elements, at least one of which is formed of an element modifying an optical path, and the others of which are bonded to the incident surface and/or exist surface of the element modifying the optical path with the low refractive index material layer in between.

According to an embodiment of the present invention, the composite optical element including the element modifying the optical path has no need to be provided with air gaps, and can be constructed as one integrated component. Accordingly, mechanical reliability and stability can be improved.

According to an embodiment of the present invention, the projection optical device includes the above-described composite optical element, and therefore mechanical reliability and stability of the whole device can be improved. In addition, since the number of reflecting surfaces formed between the optical elements can be reduced in comparison to the projection device of the related art having the air gap provided in between, there is provided the projection optical device which is excellent in using light emitted from the light source. Moreover, since a plurality of optical elements are bonded together with the low refractive index material layers in between, the projection optical device can be compact and robust.

BRIEF DESCRIPTION OF THE DRAWINGS

FIG. 15A is a diagram showing a composite optical element in the portion I and a light guided state thereof, and FIG. 15B is a diagram showing a comparative example;

FIG. 16A is a diagram showing a composite optical element in the portion II and a light guided state thereof, and FIG. 16B is a diagram showing a comparative example;

FIG. 17A is a diagram showing a composite optical element in the portion III and a light guided state thereof, and FIG. 17B is a diagram showing a comparative example; and FIG. 18A is a diagram showing a composite optical element in the portion IV and a light guided state thereof, and FIG. 18B is a diagram showing a comparative example.

DESCRIPTION OF THE PREFERRED EMBODIMENTS

Figure 1:
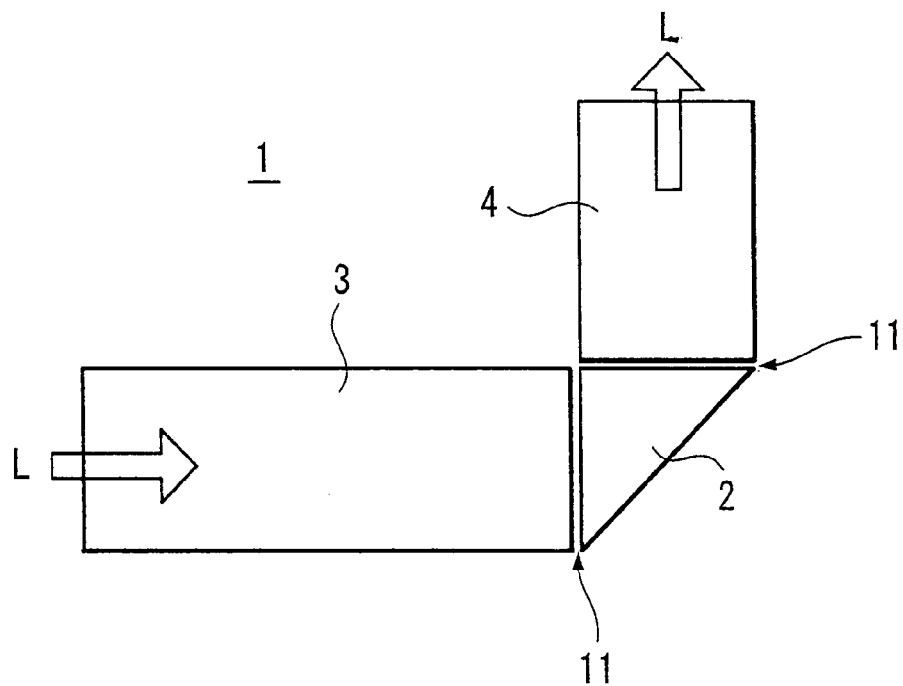
FIG. 1 is a diagram showing an example of an optical system of the related art.
Figure 2:
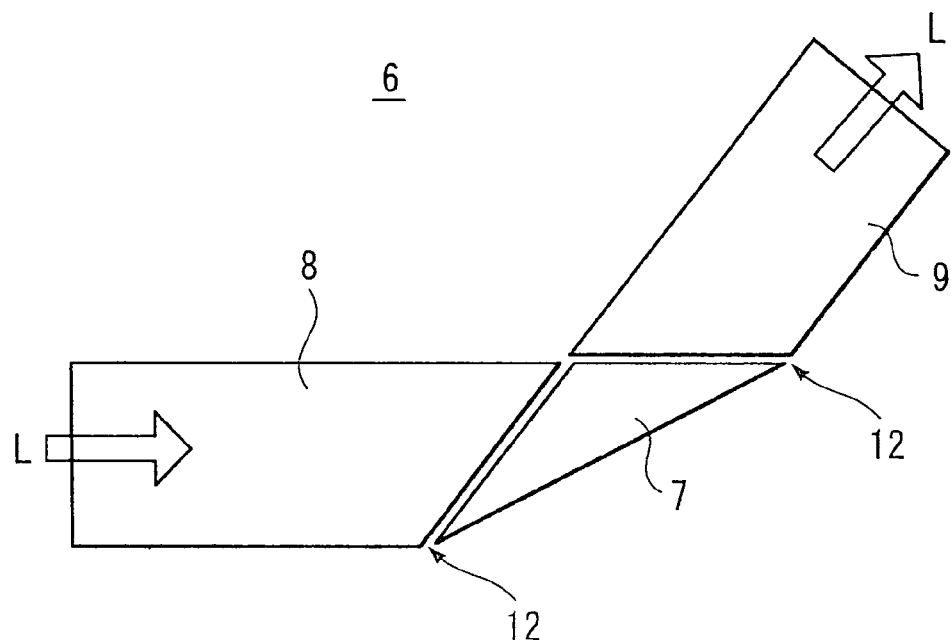
FIG. 2 is a diagram showing another example of an optical system of the related art.
Figure 3:
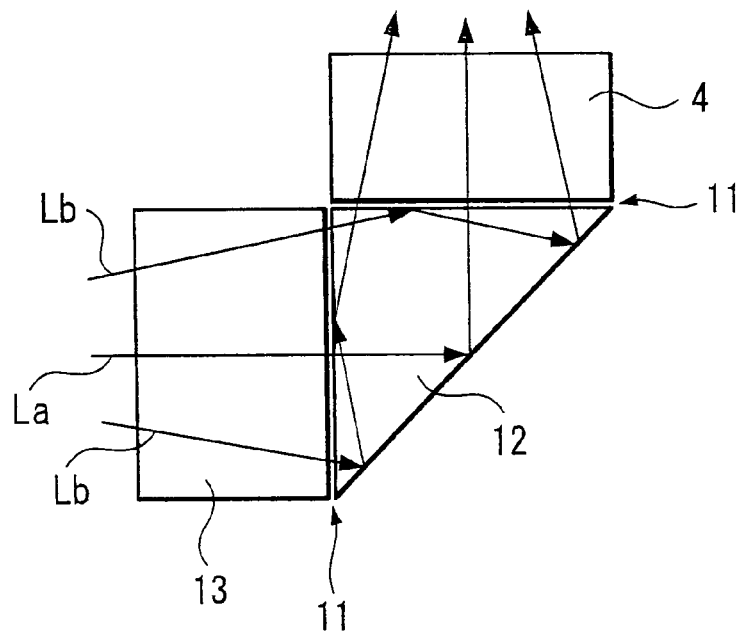
FIG. 3 is an explanatory diagram illustrating a light guided state of the optical system shown in FIG. 1.

Hereinafter, preferred embodiments of the present invention are explained by referring to the accompanying drawings. It should be noted that the embodiments of the present invention are not limited to those described below, and it should be appreciated that various modifications and alterations can be effected arbitrarily without deviating from the scope and spirit of the present invention.

First, a composite optical element according to an embodiment of the present invention is explained. The composite optical element according to the embodiment is used for optical devices of various uses. For example, the composite optical element can also be used for a transmissive or reflective optical projector including: a light source, illumination optical system, transmissive panel or reflective panel (that is, light valve or image-forming light valve), and projection optical system (projection lens).

The composite optical element according to the embodiment includes a plurality of optical elements, at least one of which is an element modifying an optical path, and the others of which are bonded to an incident surface and/or exit surface of the element modifying the optical path, specifically, bonded to one of the incident surface and exit surface, or both of the incident surface and exit side, with a low refractive index material layer in between.

The optical element modifying the optical path is herein defined as follows. Specifically, the optical element modifying the optical path includes: an optical element such as a prism to bend (change a direction of) light at a required angle, an optical element such as a polarization beam splitter and dichroic prism to divide light, an optical element such as a cross prism to combine each light, and the like.

The optical element constituting the composite optical element includes: a light pipe representing a light guiding path, the above-described optical element modifying the optical path, and other optical elements, for example. The low refractive index material layer is a material layer having a sufficiently lower refractive index than that of a material of the optical element bonded, and is designed to satisfy a total reflection condition for light entering at a shallow angle (an angle formed with a surface of the low refractive index material layer). It is desirable that a material having the refractive index of 1.4 or less be used for the low refractive index material layer in the case where the optical element is formed of a glass material, for example. For example, $MgF_2$ or fluorine system resin added acrylic resin, and fluorine system resin added epoxy resin can be used as the material having the refractive index of 1.4 or less.

It is desirable that a film thickness of the low refractive index material layer be $\lambda/4$ or more (that is, equal to or more than 25% of wavelength $\lambda$), where $\lambda$ represents the wavelength of used light. If the film thickness of the low refractive index material layer is thinner than $\lambda/4$, a function of transmitting and reflecting light may be reduced by a coupling effect of a evanescent wave. A practical upper limit of the film thickness of the low refractive index material layer is about 200 μm, more practically 100 μm or less. It is not desirable to make the film thickness thicker than required, since the low refractive index material layer may function as one optical element in such case, which may cause a disturbance to the optical system.

Reflection proportional to a difference between refractive indices of the optical element modifying the optical path and low refractive index material layer also occurs, with respect to light entering the surface on the incident side of the optical element modifying the optical path at a required angle proximate to the axis in the direction of transmitting light, and such reflection causes an optical loss. In order to avoid such optical loss, antireflective films that are optical films having one or more layers are formed on the surface, practically on both the surfaces contacting with the low refractive index material layer. It is desirable that the antireflective films be formed to have a symmetrical film thickness and material with respect to the low refractive index material layer provided in between. More specifically, the antireflective films of the same film thickness, material, and symmetrically laminated with the same kind of material films in the case of, for example, including a plurality of layers are formed on both the surfaces of the low refractive index material layer.

In the case of forming the antireflective film having two or more layers, a high refractive index film and a low refractive index film are laminated in the antireflective film. For example, niobium oxide ($Nb_2O_5$), zirconium oxide ($ZrO_2$) and titanium oxide ($TiO_2$) can be used as a material for the high refractive index film. Silicon oxide ($SiO_2$) and magnesium fluoride ($MgF_2$), for example, can be used as a material for the low refractive index film. The antireflective films thus provided can transmit all the light that enters the surface on the incident side of the optical element modifying the optical path, at a required angle proximate to the axis in the direction of transmitting the light.

In order for the low refractive index material layer to have a similar function to the air gap of the related art, a material satisfying a condition represented by the following formula (1) is selected, details of which are described later. More specifically, the low refractive index material is selected to satisfy the condition represented by:

$$\cos(\phi-\theta) < nA/nG < \cos(\theta) \quad (1)$$

where $\theta$ represents a radiation angle of light passing through an optical element constituting a light guiding path bonded to an optical element modifying an optical path; nA represents a refractive index of the low refractive index material layer; nG represents a refractive index at the incident surface and exit surface of the optical element bonded to the low refractive index material layer, in other words, a refractive indices of the optical element constituting the light guiding path and the optical element modifying the optical path; and $\phi$ represents a bending angle of the optical path.

Figure 6:
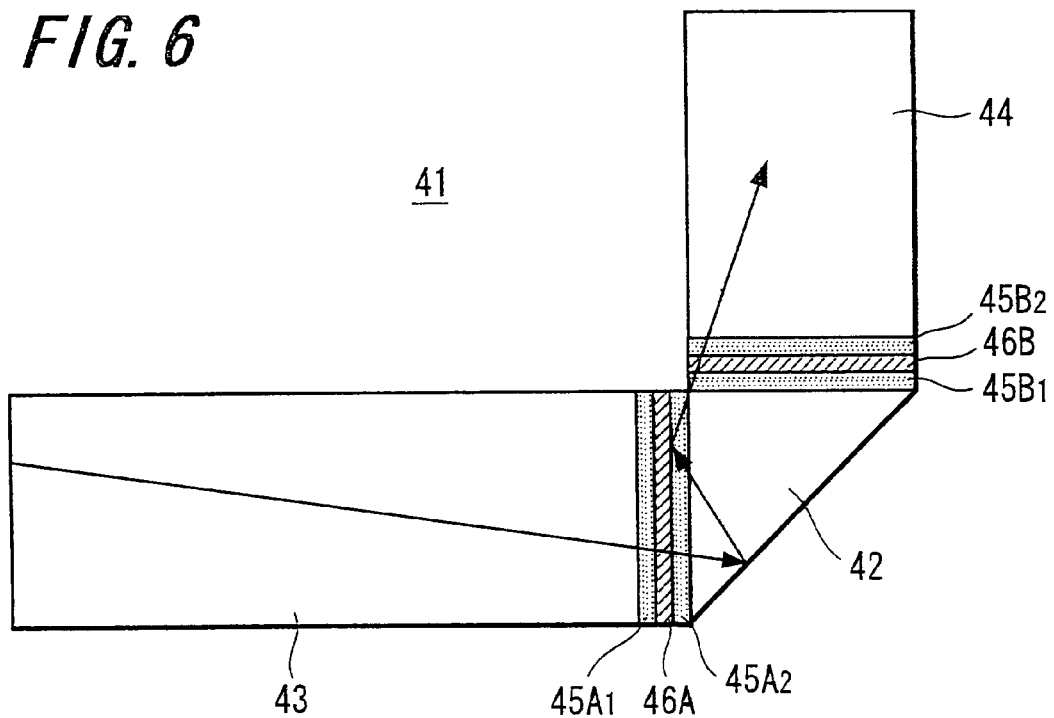
FIG. 6 is a diagram showing a composite optical element according to a first embodiment of the present invention.

FIG. 6 shows a composite optical element according to a first embodiment of the present invention. A composite optical element 41 according to this embodiment is configured such that light pipes 43 and 44 constituting light guiding component, for example, are bonded to a rectangular prism 42 representing one of the optical elements modifying the optical path provided in between. The light pipes 43 and 44 are bonded to the mutually orthogonal incident surface and exit surface of the rectangular prism 42 through a low refractive index material layer 46A having antireflective films $45A_1$ and $45A_2$ laminated on both surfaces thereof, and through a low refractive index material layer 46B having antireflective films $45B_1$ and $45B_2$ laminated similarly on both surfaces thereof, respectively.

The low refractive index material layer 46 [46A, 46B] is formed of a material having a refractive index lower than that of materials of the rectangular prism 42, and light pipes 43 and 44. The antireflective films 45 [$45A_1$, $45A_2$, $45B_1$, $45B_2$] are formed of an optical film having one or more layers. The antireflective films 45 can be formed of a laminated film including a low refractive index material film and a high refractive index material film, for example.

Figure 4:
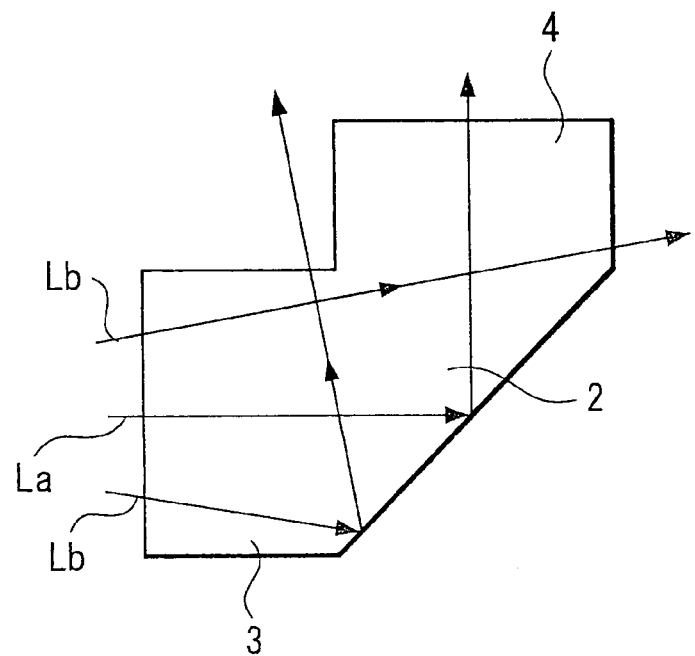
FIG. 4 is an explanatory diagram illustrating a light guided state of an optical system of a comparative example.

In the composite optical element 41 according to the first embodiment, the light pipes 43 and 44, and the rectangular prism 42 are bonded with the low refractive index material layers 46A and 46B in between. Accordingly, similarly to the configuration having the air gap provided therein, light being transmitted through the light pipe 43 and entering the rectangular prism 42 at a shallow angle through the low refractive index material layer 46A is totally reflected on the interface of the low refractive index material layer 46A, and directed to the light pipe 44 without being projected to the outside from the optical path. Since the low refractive index material layer 46B is also provided on the exit surface of the rectangular prism 42, there is no such case that light is projected to the outside from the optical path as shown in FIG. 4. In addition, since the antireflective films 45 [$45A_1$, $45A_2$, $45B_1$, $45B_2$] are laminated with the low refractive index material layer 46 [46A, 46B] in between, light is prevented from reflecting, and all the light is transmitted through the low refractive index material layer 46 [46A, 46B].

As heretofore described, a plurality of optical elements, more specifically, the rectangular prism 42, and light pipes 43 and 44 are mutually bonded to be integrated through the low refractive index material layers 46 having the antireflective films 45 on both sides thereof, thereby being provided as a single component. In the case where a plurality of optical elements are provided as a module, the plurality of optical elements can be put together into one element. In addition, since there are no air gaps provided in the related art, a size of the composite optical element can be reduced. Further, since the composite optical element is structured as one component, high positional accuracy can be obtained between optical elements, and the reliability as the composite optical element can be improved. Moreover, the number of processes for adjusting alignment can be reduced.

Further, in the case where an air gap is provided between the light pipe and prism, for example, there are generated two reflective surfaces: an interface (reflective surface) between the light pipe and, air, and an interface (reflective surface) between the air and prism. According to this embodiment, however, since the light pipe and the prism are bonded to be integrated with the low refractive index material layer in between, there is effectively only one reflective surface generated by the interface between the light pipe and prism, as a result, the reflective surface is reduced in comparison to the case in which the composite optical element has the air gap. Accordingly, light transmittance can be improved by reducing the reflective surface as described above. Further, an optical surface is in general formed with high accuracy. Since the optical surfaces formed with high accuracy are bonded together with the low refractive index material layer in between, accurate assembly can be performed. Since the mechanical accuracy is obtained, precise alignment may be maintained after being submitted to shock and environmental causes (such as, temperature change), and therefore the composite optical element is suitably applied to a device including an optical system for a portable use.

As heretofore described, according to the first embodiment, there is provided a composite optical element which is excellent in optical performance, is less expensive, and has high optical reliability.

Figure 8:
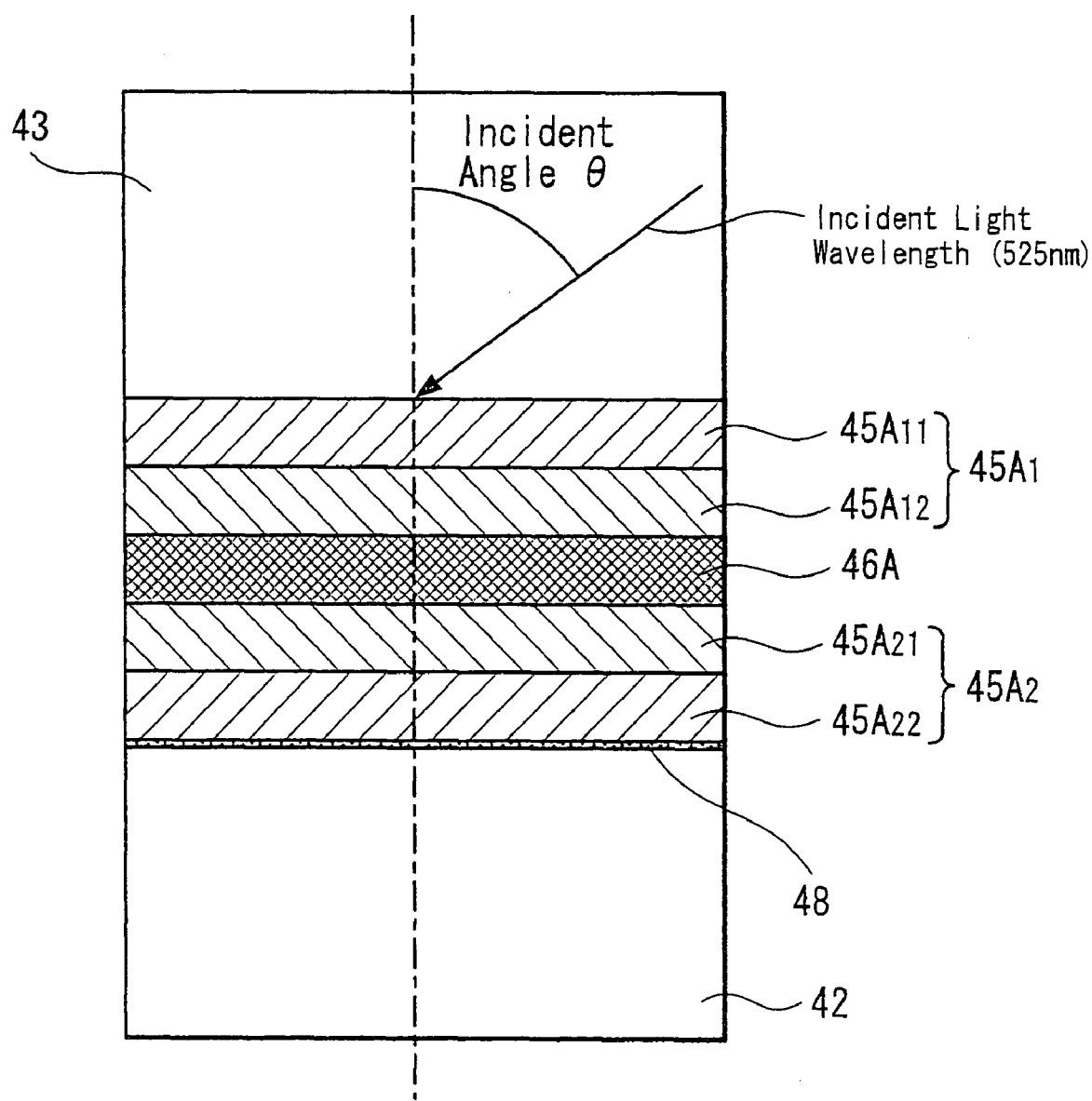
FIG. 8 is a diagram showing a relevant portion of Example 1 of the composite optical element according to the first embodiment.

Example 1 is described below. FIG. 8 shows a composite optical element in which light having a wavelength of 525 nm propagates at an angle of ±7° in the light pipes 43 and 44. It should be noted that FIG. 8 only schematically shows the rectangular prism 42 and light pipe 43 on the incident side, but the structure of the low refractive index material layer and antireflective films between the rectangular prism 42 and light pipe 44 on the exit side is the same. A glass material having the refractive index of 1.75 (high refractive index glass) is used for a material forming the rectangular prism 42 and light pipes 43 and 44. $MgF_2$ having the refractive index of 1.37 is used for a material forming the low refractive index material layers 46A and 46B. A two-layer film using $Nb_2O_5$ as the high refractive index material and $SiO_2$ as the low refractive index material respectively is used for the antireflective films $45A_1$, $45A_2$, $45B_1$ and $45B_2$.

The $Nb_2O_5$ film (antireflective high refractive index material film $45A_{11}$), $SiO_2$ film (antireflective low refractive index material film $45A_{12}$), $MgF_2$ layer (low refractive index material layer 46A), $SiO_2$ film (antireflective low refractive index material film $45A_{21}$) and $Nb_2O_5$ film (antireflective high refractive index material film $45A_{22}$) are laminated in this order on the surface of the light pipe 43 using a physical vapor deposition method such as a sputtering method or a vacuum vapor deposition method. Subsequently, the light pipe 43 having those films laminated thereon is bonded to the rectangular prism 42 using an adhesive 48 refractive index of which is adjusted to coincide with the light pipe 43 and rectangular prism 42. Similarly, the $Nb_2O_5$ film (antireflective high refractive index material film $45B_{11}$), $SiO_2$ film (antireflective low refractive index material film $45B_{12}$), $MgF_2$ layer (low refractive index material layer 46B), $SiO_2$ film (antireflective low refractive index material film $45B_{21}$) and $Nb_2O_5$ film (antireflective high refractive index material film $45B_{22}$) are laminated in this order on the surface of the light pipe 44 using the physical vapor deposition method such as the sputtering method or the vacuum vapor deposition method. Subsequently, the light pipe 44 having those films laminated thereon is bonded to the rectangular prism 42 using the adhesive 48 refractive index of which is adjusted to coincide with the light pipe 44 and rectangular prism 42, thereby obtaining the composite optical element 41.

Table 1 shows materials, refractive indices, and thicknesses of the respective light pipes, low refractive index material layers and antireflective films in Example 1.

reflective films between the rectangular prism 42 and light pipe 44 on the exit side is the same. A low refractive index adhesive such as a fluorine resin added acrylic adhesive or fluorine resin added epoxy-based adhesive, adjusted to have the same refractive index as $MgF_2$, is used as a material forming the low refractive index material layers 46A and 46B. The materials of the rectangular prism 42, light pipes 43 and 44, antireflective films $45A_1$, $45A_2$, $45B_1$ and $45B_2$, and the like are similar to those in Example 1. In Example 2, the $Nb_2O_5$ films (antireflective high refractive index material films $45A_{11}$ and $45A_{22}$) and $SiO_2$ films (antireflective low refractive index material films $45A_{12}$ and $45A_{21}$) constituting the antireflective films $45A_1$ and $45A_2$ are respectively laminated in this order on opposing surfaces of the light pipe 43 and rectangular prism 42 under the same processes using a physical vapor deposition method. The light pipe 43 and rectangular prism 42 having the $Nb_2O_5$ films (antireflective high refractive index material films $45A_{11}$ and $45A_{22}$) and $SiO_2$ films (antireflective low refractive index material films $45A_{12}$ and $45A_{21}$) respectively laminated on the opposing surfaces are bonded together using the low refractive index adhesive 46A. Similarly, the $Nb_2O_5$ films (antireflective high

TABLE 1

|  |  | Material | Refractive Index | Thickness (nm) |
| --- | --- | --- | --- | --- |
| Light Pipe 43 |  | High Refractive Index Glass | 1.75 | — |
| Antireflective Film $45A_1$ | Antireflective High Refractive Index Material Film $45A_{11}$ | $Nb_2O_5$ | 2.31 | 110 |
|  | Antireflective High Refractive Index Material Film $45A_{12}$ | $SiO_2$ | 1.47 | 90 |
| Low Refractive Index Material Layer 46A |  | $MgF_2$ | 1.37 | 200 |
| Antireflective Film $45A_2$ | Antireflective Low Refractive Index Material Film $45A_{21}$ | $SiO_2$ | 1.47 | 90 |
|  | Antireflective High Refractive Index Material Film $45A_{22}$ | $Nb_2O_5$ | 2.31 | 110 |
| Rectangular Prism 42 |  | High Refractive Index Glass | 1.75 | — |
| Antireflective Film $45B_1$ | Antireflective High Refractive Index Material Film $45B_{11}$ | $Nb_2O_5$ | 2.31 | 110 |
|  | Antireflective Low Refractive Index Material Film $45B_{12}$ | $SiO_2$ | 1.47 | 90 |
| Low Refractive Index Material Layer 46B |  | $MgF_2$ | 1.37 | 200 |
| Antireflective Film $45B_2$ | Antireflective Low Refractive Index Material Film $45B_{21}$ | $SiO_2$ | 1.47 | 90 |
|  | Antireflective High Refractive Index Material Film $45B_{22}$ | $Nb_2O_5$ | 2.31 | 110 |
| Light Pipe 44 |  | High Refractive Index Glass | 1.75 | — |

Figure 9:
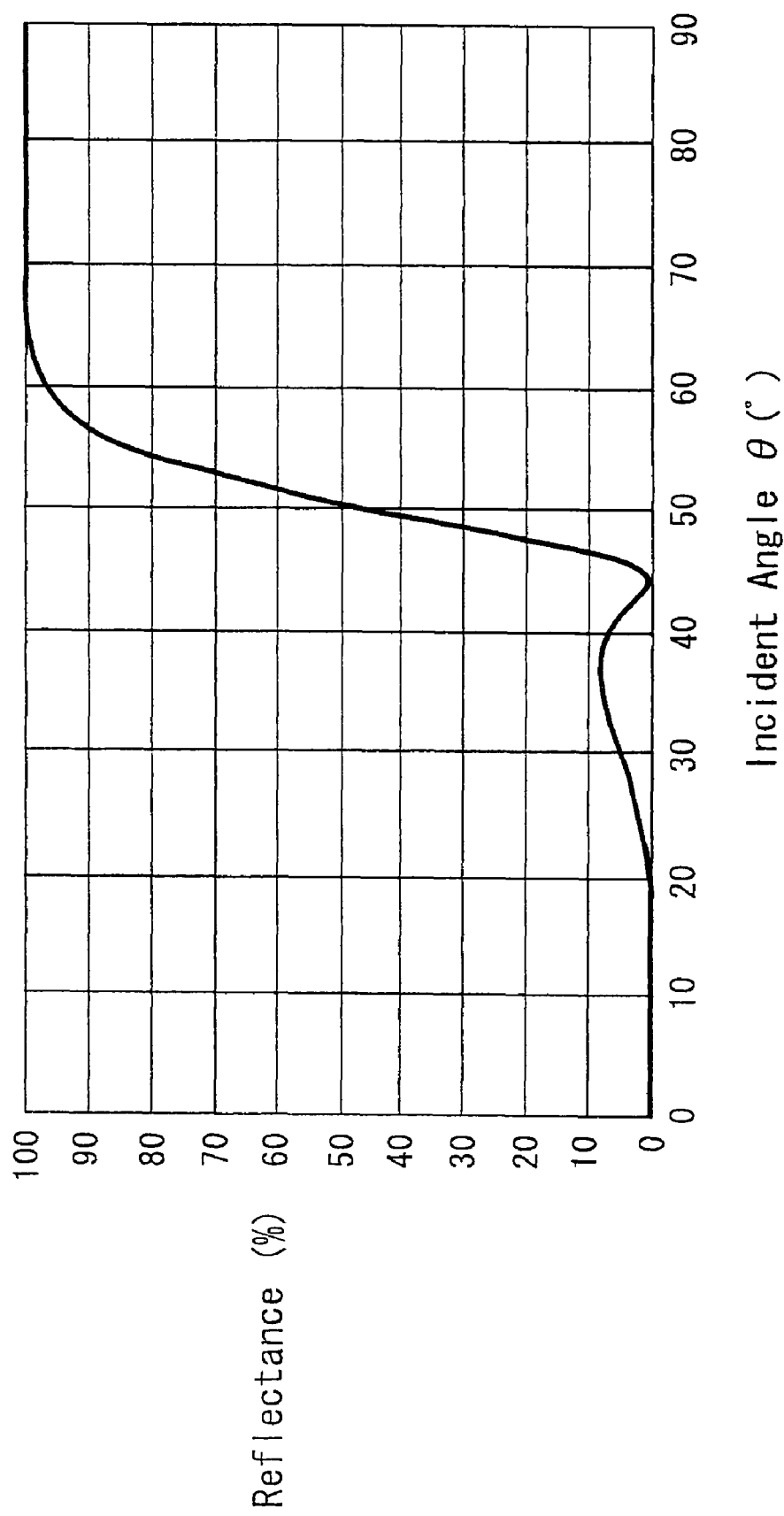
FIG. 9 is a characteristic curve showing a reflection characteristic of the composite optical element of Example 1.

FIG. 9 shows a reflection characteristic obtained using the above-described materials, refractive indices, and thicknesses. Light entering the film surface at an angle within ±10° is not reflected, and all the light entering at an angle of 70° or more can be reflected.

Figure 10:
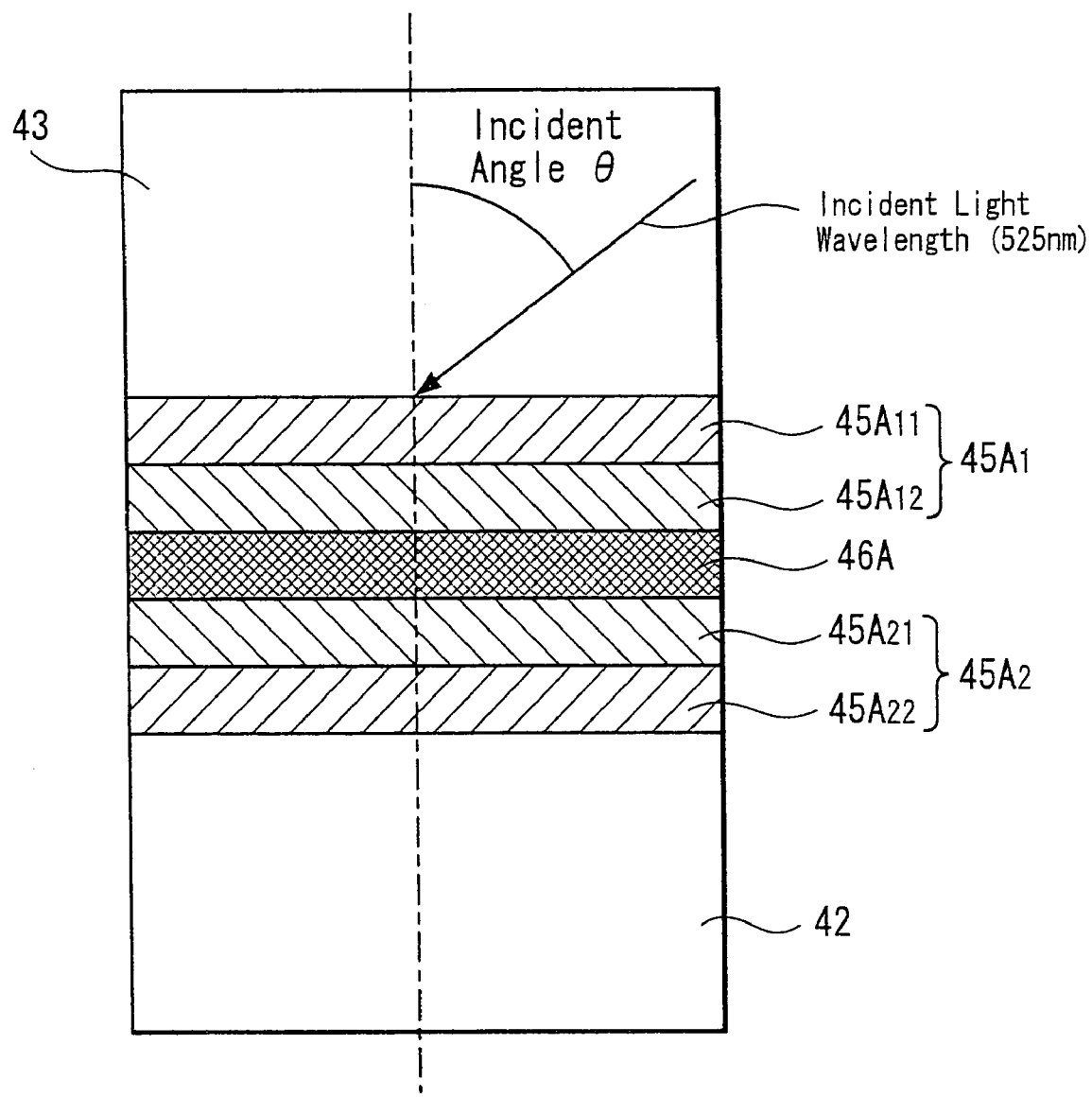
FIG. 10 is a diagram showing a relevant portion of Example 2 of the composite optical element according to the first embodiment.

Example 2 is described below (see FIG. 10): It should be noted that FIG. 10 only schematically shows the light pipe 43 on the incident side and the rectangular prism 42, but the structure of the low refractive index material layer and antirefractive index material films $45B_{11}$ and $45B_{22}$) and $SiO_2$ films (antireflective low refractive index material films $45B_{12}$ and $45B_{21}$) constituting the antireflective films $45B_1$ and $45B_2$ are respectively laminated on opposing surfaces of the light pipe 44 and rectangular prism 42, and afterward the light pipe 44 and rectangular prism 42 having those films laminated thereon are bonded together using the low refractive index adhesive 46B. The composite optical element 41 can be obtained in this manner.

Table 2 shows materials, refractive indices, and thicknesses of the respective light pipes, low refractive index material layers and antireflective films in Example 2.

TABLE 2

| | | Material | Refractive Index | Thickness (nm) |
|---|---|---|---|---|
| Light Pipe 43 | | High Refractive Index Glass | 1.75 | — |
| Antireflective Film $45A_1$ | Antireflective High Refractive Index Material Film $45A_{11}$ | $Nb_2O_5$ | 2.31 | 110 |
| | Antireflective High Refractive Index Material Film $45A_{12}$ | $SiO_2$ | 1.47 | 114 |
| Low Refractive Index Material Layer 46A | | Low Refractive Index Adhesive | 1.37 | 1,000 |
| Antireflective Film $45A_2$ | Antireflective Low Refractive Index Material Film $45A_{21}$ | $SiO_2$ | 1.47 | 114 |
| | Antireflective High Refractive Index Material Film $45A_{22}$ | $Nb_2O_5$ | 2.31 | 110 |
| Rectangular Prism 42 | | High Refractive Index Glass | 1.75 | — |
| Antireflective Film $45B_1$ | Antireflective High Refractive Index Material Film $45B_{11}$ | $Nb_2O_5$ | 2.31 | 110 |
| | Antireflective Low Refractive Index Material Film $45B_{12}$ | $SiO_2$ | 1.47 | 114 |
| Low Refractive Index Material Layer 46B | | Low Refractive Index Adhesive | 1.37 | 1,000 |
| Antireflective Film $45B_2$ | Antireflective Low Refractive Index Material Film $45B_{21}$ | $SiO_2$ | 1.47 | 114 |
| | Antireflective High Refractive Index Material Film $45B_{22}$ | $Nb_2O_5$ | 2.31 | 110 |
| Light Pipe 44 | | High Refractive Index Glass | 1.75 | — |

Figure 11:
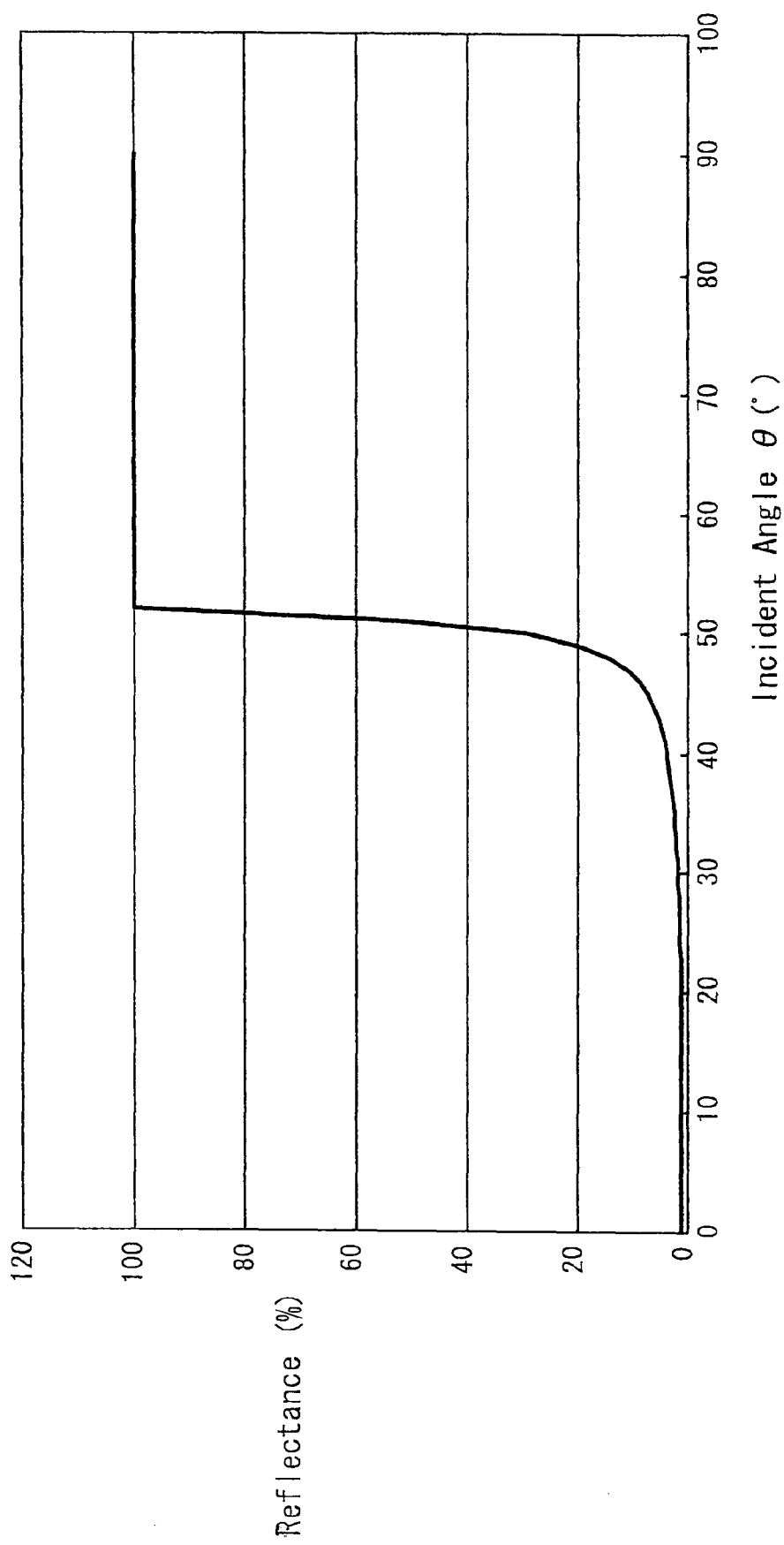
FIG. 11 is a characteristic curve showing a reflection characteristic of the composite optical element of Example 2.

FIG. 11 shows a reflection characteristic obtained using the above-described materials, refractive indices, and thicknesses.

Figure 7:
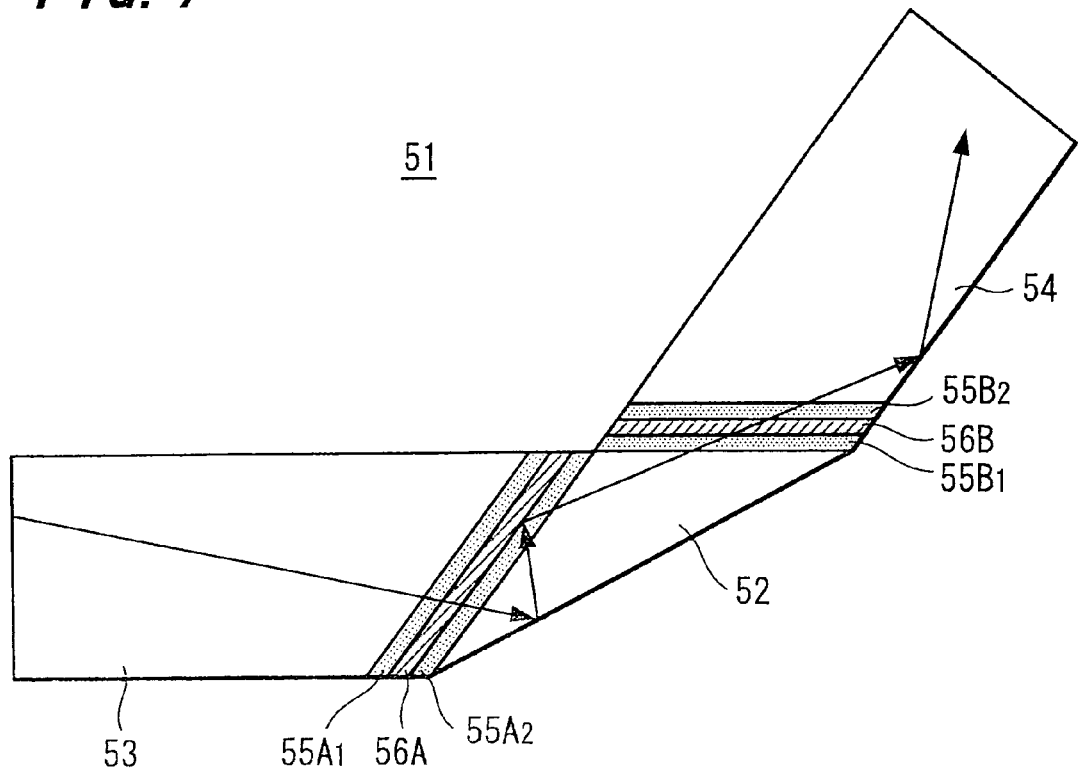
FIG. 7 is a diagram showing a composite optical element according to a second embodiment of the present invention.

FIG. 7 shows a composite optical element according to a second embodiment of the present invention. A composite optical element 51 according to this embodiment is configured such that light pipes 53 and 54 constituting light guiding components, for example, are bonded to a non-rectangular prism 52 representing one of the optical elements modifying the optical path provided in between. The light pipes 53 and 54 are bonded to the incident surface and exit surface of the non-rectangular prism 52 respectively through a low refractive index material layer 56A having antireflective films $55A_1$ and $55A_2$ laminated respectively on both surfaces thereof similarly to the above-described first embodiment, and through a low refractive index material layer 56B having antireflective films $55B_1$ and $55B_2$ laminated similarly on both surfaces thereof. Here, the non-rectangular prism represents a prism to bend the direction of light at a required angle that is not orthogonal.

The same materials as used in the first embodiment can be used for materials of the non-rectangular prism 52, light pipes 53 and 54, low refractive index material layers 56A and 56B, and antireflective films $55A_1$, $55A_2$, $55B_1$ and $55B_2$, and therefore redundant explanations thereof are omitted. The other structures are also similar to the first embodiment, and therefore redundant explanations thereof are omitted.

In the composite optical element 51 according to the second embodiment, the non-rectangular prism 52, and light pipes 53 and 54 are bonded with the low refractive index material layers 56A and 56B in between. Therefore, as well as the first embodiment described above, light propagated through the light pipe 53 on the incident side can be directed efficiently to the light pipe 54 on the exit side through the non-rectangular prism 52 without being projected to the outside of the optical path, similarly to the configuration with the air gap provided in between. Further, similar effectiveness to the first embodiment can be obtained.

Figure 12:
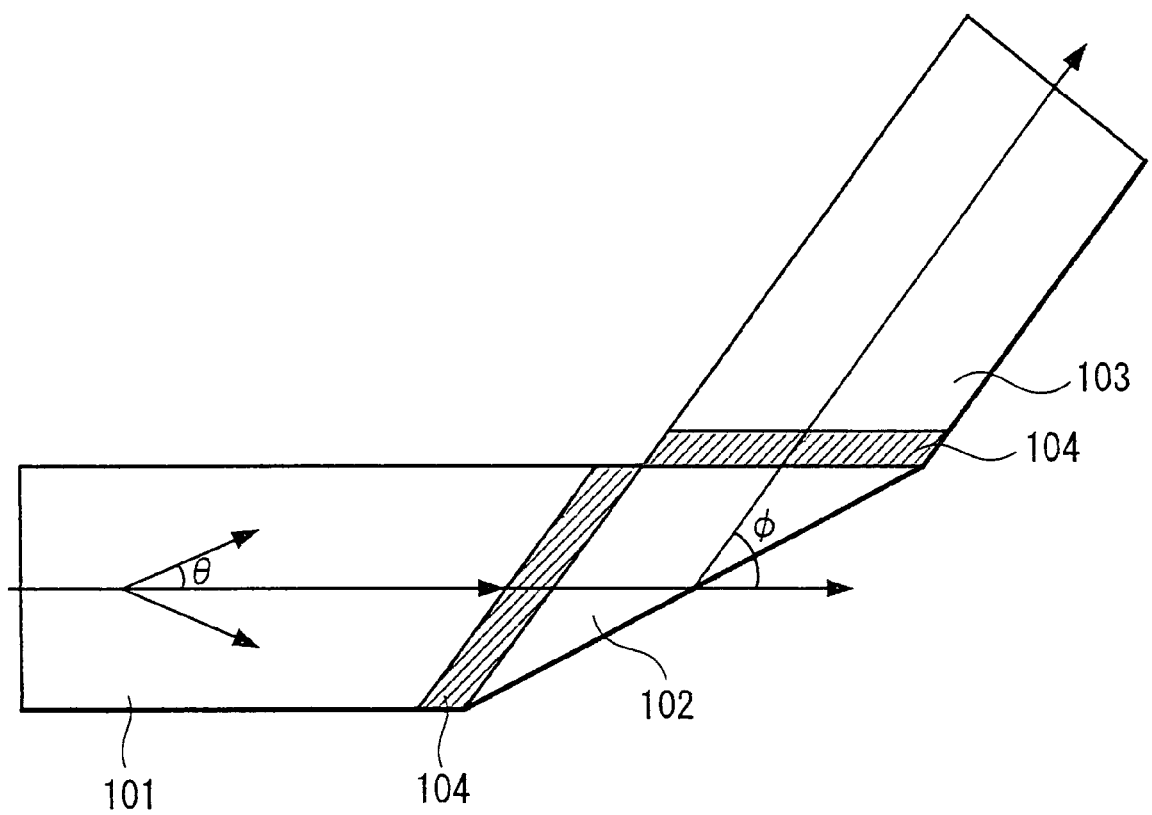
FIG. 12 is an explanatory diagram provided for explaining a total reflection condition on an interface of a low refractive index material layer of the composite optical element according to an embodiment of the present invention.

Conditions enabling the total reflection to occur on the interfaces of the above-described low refractive index material layers in the case of including the respective composite optical elements 41 and 51 of the first and second embodiments are described below. See FIG. 12. φ represents a deflection angle of a light guiding path (101, 102, 103), and θ represents a radiation angle of light passing through the light guiding path 101. nA represents the refractive index of a low refractive index material layer 104, and nG represents the refractive index of the light guiding path (101, 102, 103). When the radiation angle θ is expressed using F value of the optical system, 1/F=2nG·sin(θ). In this case, the total reflection on the interface of the low refractive index material layer 104 is obtained when the following three conditions are satisfied:

$$\cos(\phi-\theta) < nA/nG \quad 1)$$

$$\cos(\theta+\phi/2) > 1/nG \quad 2)$$

$$\cos(\theta) > nA/nG \quad 3)$$

Next, an embodiment of a projection optical device using the composite optical element according to the embodiments is explained with reference to composite optical elements used in the projection optical device.

Figure 13:
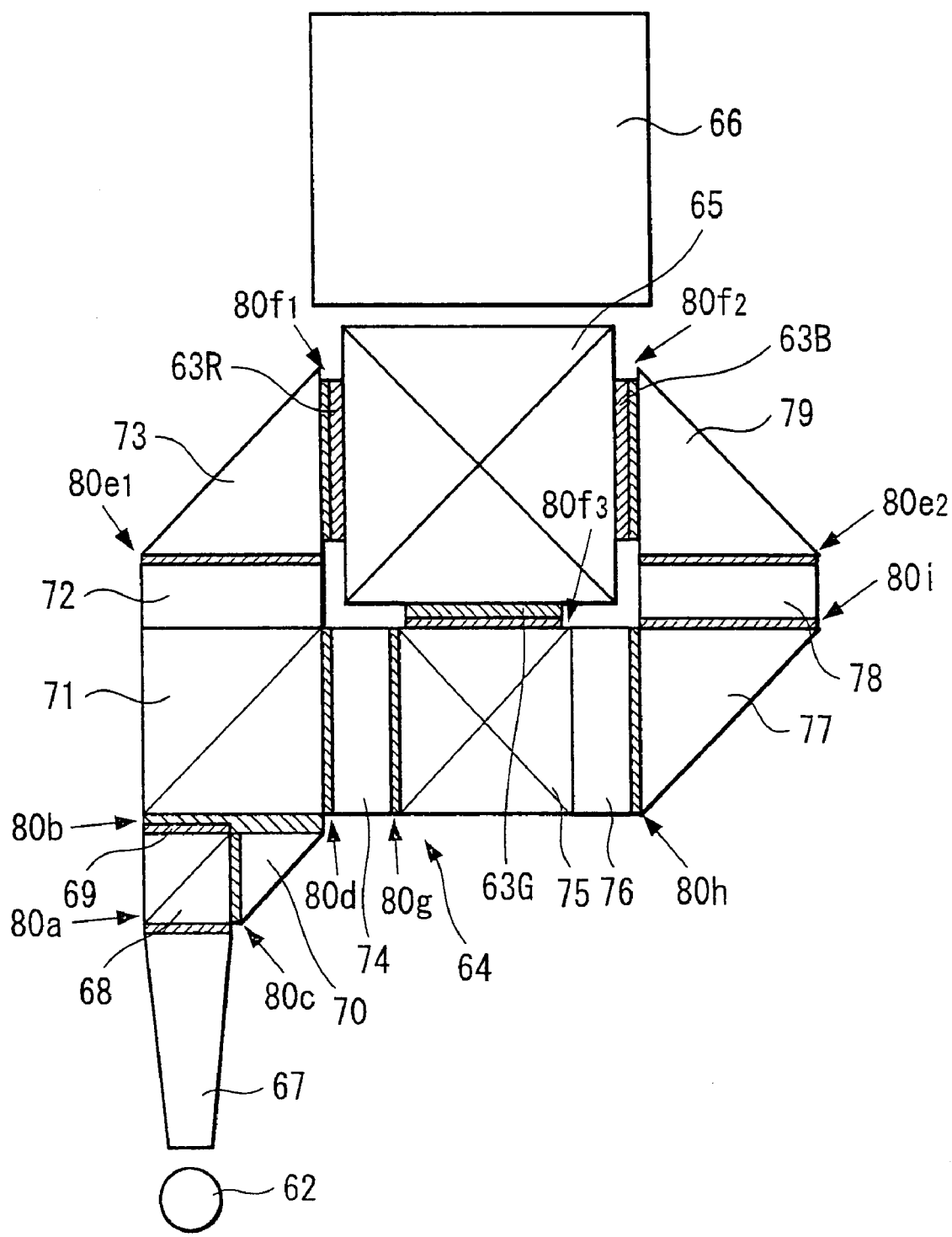
FIG. 13 is a diagram showing a projection optical device according to an embodiment of the present invention.

FIG. 13 shows an projection optical device according to an embodiment of the present invention. The projection optical device according to the embodiment is configured such that air gaps between optical elements modifying the optical path and other opposed optical elements in the above-described projection optical device of FIG. 5 are replaced with the low refractive index material layers having the antireflective films on both sides thereof according to the above-described embodiment of the present invention.

Figure 5:
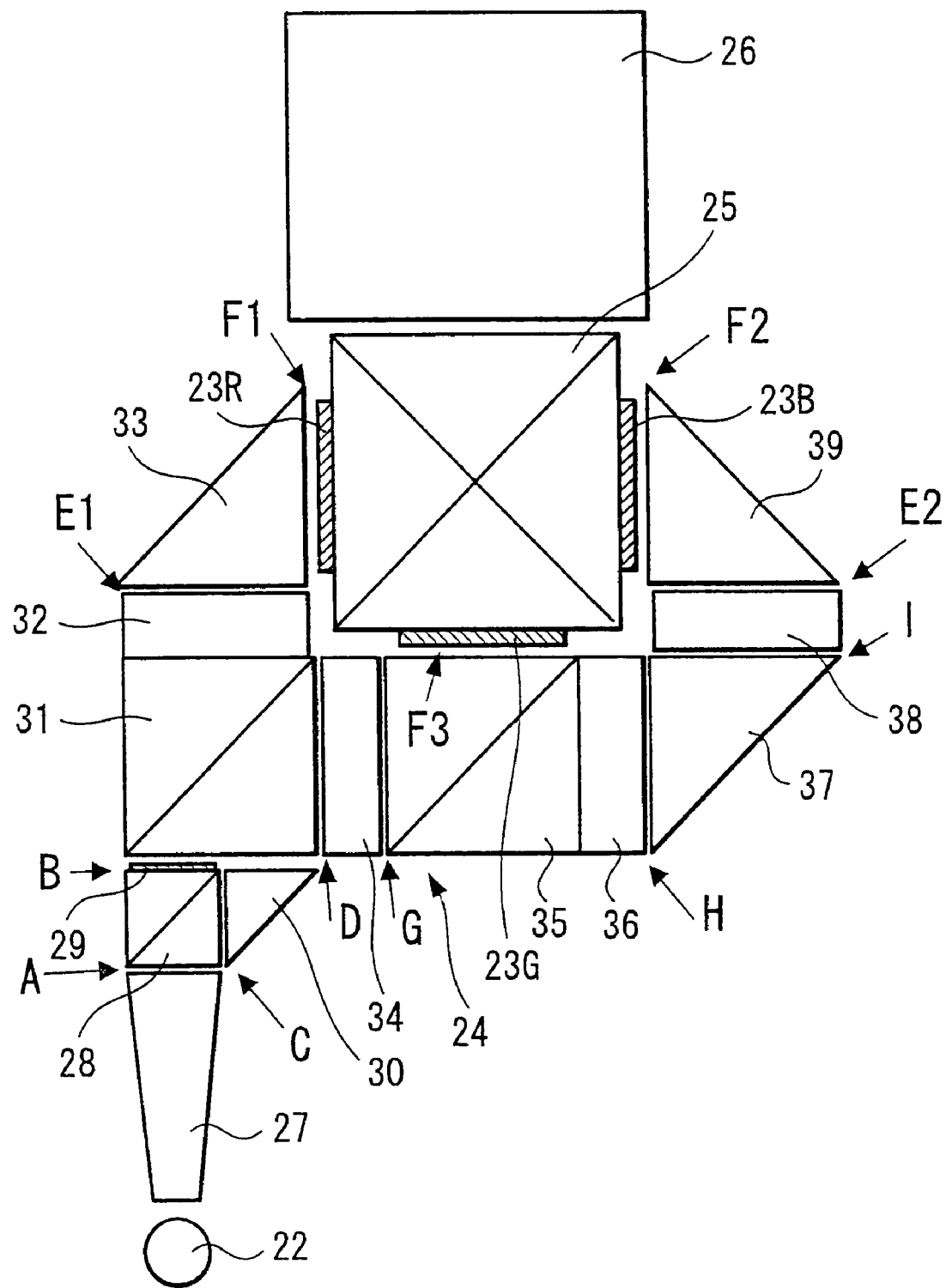
FIG. 5 is a diagram showing an example of a projection optical device of the related art.

FIG. 13 shows a projection optical device (optical projector) 61 according to this embodiment configured similarly to FIG. 5, including a white light source 62, image-forming light valves 63R, 63G, and 63B corresponding to red, green, and blue, illumination optical system 64 that separates light emitted from the white light source 62 into bands of wavelengths of red, green, and blue so that light of respective bands of wavelengths enters the corresponding image-forming light valves 63R, 63G, 63B. Further, the projection optical device includes a cross prism 65 that is an optical element to combine color light respectively modulated in accordance with image information using the image-forming light valves (a kind of optical elements) 63R, 63G and 63B, and projection lens 66.

The illumination optical system 64 includes: a tapered light pipe 67 to guide the light emitted from the white light source 62, polarization beam splitter 68 to divide the light emitted from the white light source 62 into a P-wave and an S-wave, ½ wavelength plate 69 disposed at one exit surface of the polarization beam splitter 68, and first rectangular prism 70 being disposed at the other exit surface of the polarization beam splitter 28 and orthogonally bending the optical path. Further, the illumination optical system 64 includes a first dichroic prism 71 that is an optical element to divide light and is disposed at exit surfaces of the ½ wavelength plate 69 and first rectangular prism 70, second rectangular prism 73 disposed at one exit surface of the first dichroic prism 71 with a light pipe 72 in between, and second dichroic prism 75 disposed at the other exit surface of the first dichroic prism 71 with a light pipe 74 in between. Moreover, the illumination optical system 64 includes a third rectangular prism 77 disposed at one exit surface of the second dichroic prism 75 with a light pipe 76 in between, and fourth rectangular prism 79 disposed at an exit surface of the third rectangular prism 77 with a light pipe 78 in between.

The first dichroic prism 71 transmits the first color light of red, for example, and reflects the second color light and third color light of, for example, blue and green. The second dichroic prism 75 transmits the second color light of blue, for example, and reflects the third color light of green. An exit surface of the second rectangular prism 73 faces the red image-forming light valve 63R, for example. The other exit surface of the second dichroic prism 75 faces the green image-forming light valve 63G, for example. An exit surface of the fourth rectangular prism 79 faces the blue image-forming light valve 63B, for example.

The image-forming light valves 63R, 63G and 63B are formed of liquid crystal panels and polarization plates, for example. The polarization beam splitter 28 transmits the P-wave and reflects the S-wave, for example.

Further, according to this embodiment, the elements modifying the optical path such as the polarization beam splitter 68, first and second dichroic prisms 71 and 76, first, second, third and fourth rectangular prisms 70, 73, 77 and 79, and cross prism 65 are bonded to the optical elements disposed at the incident surfaces and/or exit surfaces of the elements modifying the optical path. The elements modifying the optical path and the other optical elements are bonded through low refractive index material layers (hereinafter, referred to as IAF layer: Incident Angle Film) 80 [80a, 80b, 80c, 80d, 80$e_1$, 80$e_2$, 80$f_1$, 80$f_2$, 80$f_3$, 80g, 80h, 80i] having antireflective films laminated on both sides thereof according to the above-described embodiment of the present invention. The composite optical elements bonded through the IAF layers 80 are described later in detail.

In the projection optical device 61, light emitted from the white light source 62 is directed to the tapered light pipe 67 and is incident on the polarization beam splitter 68, similarly to FIG. 5. The P-wave that is one divided component of the light entered the polarization beam splitter 68 is transmitted through the polarization beam splitter 68, and converted into the S-wave by the ½ wavelength plate 69 to be incident on the first dichroic prism 71. On the other hand, the S-wave that is the other component of the light divided (reflected) by the polarization beam splitter 68 is orthogonally bent by the first rectangular prism 70, and incident on the first dichroic prism 71.

The light entered the first dichroic prism 71 is divided. Red light divided is transmitted through the dichroic prism 71, and passes through the light pipe 72 and second rectangular prism 73 to be incident on the red image-forming light valve 63R. On the other hand, green light and blue light divided are reflected by the dichroic prism 71, are directed to the light pipe 74, and enter the second dichroic prism 75 to be divided. Specifically, the green light divided is reflected by the dichroic prism 75 to be incident on the green image-forming light valve 63G. The blue light divided is transmitted through the dichroic prism 75, passes through the light pipe 76, third rectangular prism 77, light pipe 78 and fourth rectangular prism 79 to be incident on the blue image-forming light valve 63B.

Color light components of red, green, and blue modulated in respective image-forming light valves 63R, 63G and 63B in accordance with image information enter the cross prism 65 and are combined. The combined image information light is magnified by the projection lens 66 and projected on the screen.

In the projection optical device 61 according to the embodiment, a plurality of optical elements including the optical elements modifying the optical path are bonded with the IAF layers 80 in between, among a plurality of optical elements constituting the projection optical device 61, specifically, the illumination optical system 64, image display apparatuses 63 [63R, 63G, 63B], cross prism 65, and the like. As heretofore described, the plurality of optical elements are integrally bonded using the IAF layers 80 instead of air gaps of the related art so that the plurality of optical elements can be structured as a single composite optical element, thereby improving the positional accuracy between the individual optical elements and also increasing the reliability of the whole device. In the case where the optical system is configured as a module, a plurality of optical elements can be integrated into one component and air gaps of the related art can be eliminated, and therefore, the device can be smaller in size and robust. In addition, without air gaps of the related art, the number of reflection surfaces are reduced, and therefore light transmittance can be improved. Further, since the optical surfaces are mutually bonded with the IAF layers 80 in between, accurate assembly can be performed.

As a result, using the projection optical device 61 according this embodiment, there is provided the projection optical device, more specifically, the projection display apparatus, which is excellent in efficiency in the use of light emitted from the light source and which is compact and robust.

Figure 14:
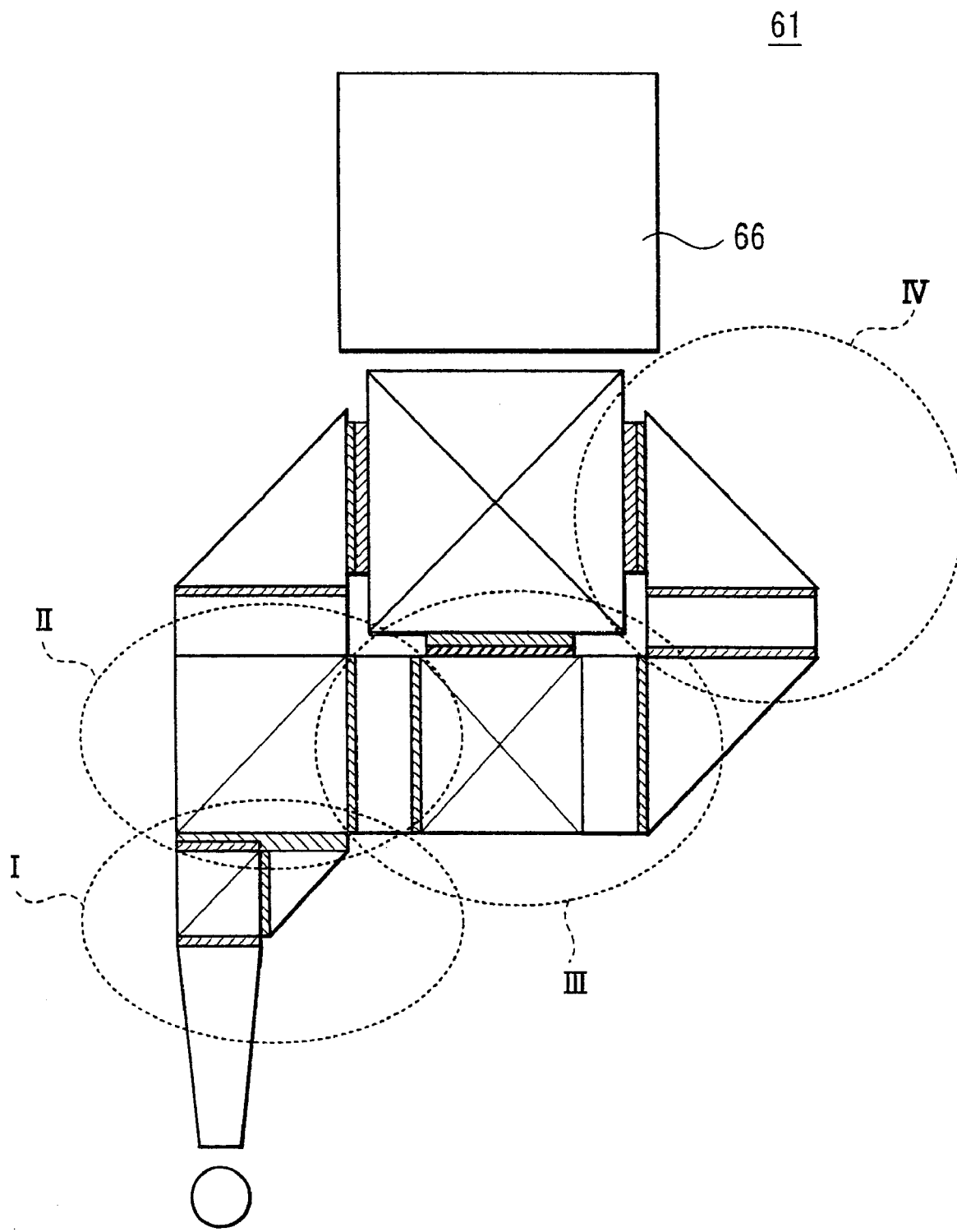
FIG. 14 is, a diagram showing divided portions I to IV of the projection optical device shown in FIG. 13.

FIG. 14 shows the projection optical device 61 shown in FIG. 13, relevant part of which is divided into portions I, II, III and IV. FIGS. 15 through 18 are diagrams showing respective composite optical elements for portions I, II, III and IV in the projection optical device 61.

FIG. 15A corresponds to the portion I and shows the composite optical element including: the light pipe 67, polarization beam splitter 68, ½ wavelength plate 69, first rectangular prism 70, and dichroic prism 71 mutually bonded with the IAF layers 80 in between. Specifically, the light pipe 67 is bonded to the incident surface of the polarization beam splitter 68 with the IAF layer 80a in between. One exit surface of the polarization beam splitter 68 is bonded to the incident surface of the first rectangular prism 70 with the IAF layer 80c in between. The exit surface of the ½ wavelength plate 69 disposed at the other exit surface of the polarization beam splitter 68 and the exit surface of the first rectangular prism are bonded to the incident surface of the first dichroic prism 71 with the IAF layer 80b in between. In this composite optical element, light propagated in the light pipe 67 is divided and modified without being leaked to the outside. As a result, all the propagated light enters the dichroic prism 71 as shown by arrows.

As shown in FIG. 15B, in the case where the above-described respective optical elements 67, 68, 70, 69 and 71 are simply stuck together, light may partially leak to the outside as shown by bold arrows, and the function of the optical elements is impaired.

FIG. 16A corresponds to the portion II and shows the composite optical element including: the polarization beam splitter 68, ½ wavelength plate 69, first rectangular prism 70 (shown as one block in this figure), dichroic prism 71, and light pipes 72 and 74, which are bonded at the incident surface and exit surface of the first dichroic prism 71 respectively with the IAF layers 80 in between. Specifically, the exit surface of the block (68, 69, 70) is bonded to the incident surface of the first dichroic prism 71 with the IAF layer 80b in between. One exit surface of the first dichroic prism 71 is bonded to the light pipe 74 with the IAF layer 80d in between. In this composite optical element, light entered from the block (68, 69, 70) is propagated into the light pipe 72 or the light pipe 74 through the dichroic prism 71 without being leaked to the outside from the optical path as shown by the arrows.

As shown in FIG. 16B, in the case where the above-described respective optical elements (68, 69, 70), 71, and 74 are simply stuck together, light may partially leak to the outside as shown by bold arrows, and the function of the optical elements is impaired.

FIG. 17A corresponds to the portion III and shows the composite optical element including: the light pipe 74, second dichroic prism 75, green image-forming light valve 63G, light pipe 76, third rectangular prism 77 and light pipe 78, which are bonded at the incident surface and exit surface of the second dichroic prism 75, and bonded at the incident surface and exist side surface of the third rectangular prism 77 with the IAF layers 80 in between. Specifically, the incident surface of the second dichroic prism 75 is bonded to the light pipe 74 with the IAF layer 80g in between. One exit surface of the second dichroic prism 75 is bonded to the incident surface of the green image-forming light valve 63G with the IAF layer 80$f_3$ in between. The light pipe 76 disposed at the other exit surface of the second dichroic prism 75 is bonded to the incident surface of the third rectangular prism 77 with the IAF layer 80h in between. The exit surface of the third rectangular prism 77 is bonded to the light pipe 78 with the IAF layer 80i in between. In this composite optical element, all the light is propagated into the green image-forming light valve 63G or the light pipe 78 without being leaked to the outside from the optical path as shown by the arrows.

As shown in FIG. 17B, in the case where the above-described respective optical elements 74, 75, 63G, 77, and 78 are simply stuck together, light may partially leak to the outside from the optical path as shown by bold arrows, and the function of the optical elements is impaired.

FIG. 18A corresponds to the portion IV and shows the composite optical element including: the light pipe 78, fourth rectangular prism 79, and blue image-forming light valve 63B mutually bonded with the IAF layers 80 in between. Specifically, the light pipe 78 is bonded to the incident surface of the fourth rectangular prism 79 with the IAF layer 80$e_2$ in between. The exit surface of the fourth rectangular prism 79 is bonded to the blue image-forming light valve 63B with the IAF layer 80$f_2$ in between. In this composite optical element, light enters the blue image-forming light valve 63B without being leaked to the outside from the optical path as shown by the arrows.

As shown in FIG. 18B, in the case where the above-described respective optical elements 78, 79, and 63B are simply stuck together, light may partially leak to the outside as shown by bold arrows, and the function of the optical elements is impaired.

FIG. 13 shows only a projection optical device according to an embodiment of the present invention, and the composite optical element according to an embodiment of the present invention can be applied to various other kinds of projection optical devices. For example, a liquid crystal panel having a polarization plate is used as the image-forming light valve 63, but a DMD element, another light valve, and the like can be used as the image-forming light valve. Further, an extra high pressure mercury lamp, laser light source, and other light sources can also be used for the light source 62. In addition, one white color light source is used in the above-described embodiments, however, three light sources of red, green, and blue can also be used. It is needless to say that a configuration of the projection optical device such as a configuration of an illumination optical system can be changed depending on the configuration as described above.

The projection optical device according to the embodiments of the present invention can also be applied to a projector that electrically converts an image, slide projector that simply projects an image, and the like.

It should be understood by those skilled in the art that various modifications, combinations, sub-combinations and alterations may occur depending on design requirements and other factors insofar as they are within the scope of the appended claims or the equivalents thereof.

What is claimed is:
1. A composite optical element comprising:
a plurality of optical elements, wherein
at least one of the optical elements is formed of an element modifying an optical path, and wherein there is at least one optical element bonded to an incident surface and another optical element bonded to an exit surface of the element modifying the optical path with a low refractive index material layer in between each optical element and the element modifying the optical path and further comprising an antireflective film made of an optical film having one or more layers laminated at each surface of the low refractive index material layer that is between each optical element and the element modifying the optical path such that each low refractive index material is located between antireflective films.

2. A composite optical element according to claim 1, wherein
the low refractive index material layer has a thickness of $\lambda/4$ or more, where $\lambda$ represents a wavelength of light to be used.

3. A composite optical element according to claim 1, wherein
the antireflective films are formed to have a symmetrical film thickness and material with respect to the low refractive index material layer provided in between.

4. A composite optical element according to claim 1, wherein
a relationship represented by:

$$\cos(\phi-\theta) < nA/nG < \cos(\theta)$$

is obtained, where nA represents a refractive index of the low refractive index material layer, nG represents a refractive index of the optical element, $\theta$ represents a radiation angle of an optical system, and $\phi$ represents an angle of the optical path bent by the element modifying the optical path.

5. A projection optical device comprising:
a composite optical element including
a plurality of optical elements, wherein
at least one of the optical elements is formed of an element modifying an optical path, and
wherein there is at least one optical element bonded to an incident surface and another optical element bonded to an exit surface of the element modifying the optical path with a low refractive index material layer in between each optical element and the element modifying the optical path and further comprising an antireflective film made of an optical film having one or more layers laminated at each surface of the low refractive index material layer that is between each optical element and the element modifying the optical path such that each low refractive index material is located between antireflective films.

6. A projection optical device according to claim 5, wherein
the low refractive index material layer has a thickness of $\lambda/4$ or more, where $\lambda$ represents a wavelength of light to be used.

7. A projection optical device according to claim 5, wherein
the antireflective films are formed to have a symmetrical film thickness and material with respect to the low refractive index material layer provided in between.

8. A projection optical device according to claim 5, wherein
a relationship represented by:

$$\cos(\phi-\theta) < nA/nG < \cos(\theta)$$

is obtained, where nA represents a refractive index of the low refractive index material layer, nG represents a refractive index of the optical element, $\theta$ represents a radiation angle of an optical system, and $\phi$ represents an angle of the optical path bent by the element modifying the optical path.

9. A composite optical element according to claim 1, wherein the antireflective films are symmetrically formed at each side of the low refractive index material.

10. A projection optical device according to claim 5, wherein the antireflective films are symmetrically formed at each side of the low refractive, index material.

11. A composite optical element according to claim 1, wherein the antireflective films are symmetrically formed at each side of the low refractive index material and are comprised of at least one high refractive index film and one low refractive index film.

12. A projection optical device according to claim 5, wherein the antireflective films are symmetrically formed at each side of the low refractive index material and are comprised of at least one high refractive index film and one low refractive index film.

* * * * *